(12) United States Patent
Zhang et al.

(10) Patent No.: US 10,482,316 B2
(45) Date of Patent: Nov. 19, 2019

(54) IMAGE INFORMATION PROCESSING METHOD AND APPARATUS, AND COMPUTER STORAGE MEDIUM

(71) Applicant: Tencent Technology (Shenzhen) Company Limited, Shenzhen (CN)

(72) Inventors: Zhenwei Zhang, Shenzhen (CN); Xinlei Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 84 days.

(21) Appl. No.: 15/815,457

(22) Filed: Nov. 16, 2017

(65) Prior Publication Data
US 2018/0075289 A1 Mar. 15, 2018

Related U.S. Application Data
(63) Continuation-in-part of application No. PCT/CN2016/077762, filed on Mar. 29, 2016.

(30) Foreign Application Priority Data
Nov. 25, 2015 (CN) .......................... 2015 1 0830220

(51) Int. Cl.
*G06K 9/00* (2006.01)
*H04L 12/58* (2006.01)
(Continued)

(52) U.S. Cl.
CPC ........... *G06K 9/00248* (2013.01); *G06K 9/00* (2013.01); *G06K 9/00255* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2003/0007700 A1* | 1/2003 | Gutta | ...................... G06T 17/00 382/282 |
| 2010/0157084 A1* | 6/2010 | Shimamura | ........ G06K 9/00228 348/222.1 |

(Continued)

FOREIGN PATENT DOCUMENTS

| | | |
|---|---|---|
| CN | 101272457 A | 9/2008 |
| CN | 101324961 A | 12/2008 |

(Continued)

OTHER PUBLICATIONS

Tencent Technology, ISRWO, PCT/CN2016/077762, dated Sep. 1, 2016, 7 pgs.

(Continued)

*Primary Examiner* — John W Lee
(74) *Attorney, Agent, or Firm* — Morgan, Lewis & Bockius LLP

(57) ABSTRACT

An image processing method includes: locating respective image regions corresponding to one or more persons captured in a first image; extracting feature information of a respective facial portion of at least a first person of the one or more persons located in the first image; identifying, from a plurality of image tiles, a first image tile that matches the respective facial portion of the first person in accordance with predefined correspondence between the feature information of the respective facial portion of the first person and pre-stored description information of the first image tile; and forming, by replacing the respective facial portion of the first person in the first image with the first image tile, a second image that includes at least a modified version of the (Continued)

Recognize a first part of a specified graphic object in a first image, and extract feature information of the first part. — S110

Determine a first tile matching the first part by matching the feature information of the first part with tile description information — S120

Form, by replacing, the first part in the first image with the first tile, a second image displaying the first tile — S130 respective image region corresponding to the first person of the one or more persons.

11 Claims, 5 Drawing Sheets

(51) Int. Cl.
  *H04N 5/232* (2006.01)
  *H04N 5/262* (2006.01)
(52) U.S. Cl.
  CPC ............ *H04L 51/046* (2013.01); *H04L 51/10* (2013.01); *H04L 51/18* (2013.01); *H04N 5/23219* (2013.01); *H04N 5/2621* (2013.01); *H04L 51/32* (2013.01)

(56) References Cited

U.S. PATENT DOCUMENTS

2012/0099002 A1    4/2012  Lee et al.
2014/0025737 A1*   1/2014  Kruglick ................. H04W 4/21
                                                        709/204

FOREIGN PATENT DOCUMENTS

CN      103778376 A     5/2014
CN      104284055 A     1/2015

OTHER PUBLICATIONS

Tencent Technology, IPRP, PCT/CN2016/077762, dated May 29, 2018, 6 pgs.

* cited by examiner

US 10,482,316 B2

IMAGE INFORMATION PROCESSING METHOD AND APPARATUS, AND COMPUTER STORAGE MEDIUM

PRIORITY CLAIM AND RELATED APPLICATIONS

This application is a continuation-in-part application of PCT/CN2016/077762, entitled "METHOD AND APPARATUS FOR PROCESSING IMAGE INFORMATION, AND COMPUTER STORAGE MEDIUM" filed on Mar. 29, 2016, which claims priority to Chinese Patent Application No. 201510830220.1, filed with the State Intellectual Property Office of the People's Republic of China on Nov. 25, 2015, and entitled "METHOD AND APPARATUS FOR PROCESSING IMAGE INFORMATION, AND COMPUTER STORAGE MEDIUM", both of which are incorporated herein by reference in their entirety.

FIELD OF THE TECHNOLOGY

The present disclosure relates to the field of information technologies, and in particular, to an image information processing method and apparatus, and a computer storage medium.

BACKGROUND OF THE DISCLOSURE

With the development of information technologies, image processing capabilities of electronic devices are enhanced. The electronic devices may include mobile phones, tablet computers, notebook computers, desktop computers, wearable devices, and the like. The electronic devices may determine, by using a facial recognition technology, a celebrity star that looks like a person in an image, and display a text or output the face of the star that looks like the person in the image. However, additional requirements or more interesting operations cannot be satisfied in this process, and intelligence of the electronic devices is still very low.

SUMMARY

In view of this, embodiments of the present technology provide an image information processing method and apparatus, to at least partially resolve a problem in the prior art that intelligence is low during image processing.

Technical solutions provided in the embodiments of the present technology are as follows:

One aspect of the embodiments of the present technology provides an image information processing method, including:

recognizing a first part of a specified graphic object in a first image, and extracting feature information of the first part;

determining a first tile matching the first part by matching the feature information of the first part with tile description information; and forming, by replacing the first part in the first image with the first tile, a second image displaying the first tile.

Another aspect of the embodiments of the present technology provides an image information processing apparatus, including:

a recognition unit, configured to: recognize a first part of a specified graphic object in a first image, and extract feature information of the first part;

a matching unit, configured to determine a first tile matching the first part by matching the feature information of the first part with tile description information; and a forming unit, configured to form, by replacing the first part in the first image with the first tile, a second image displaying the first tile.

Yet another aspect of the embodiments of the present technology provides a computer storage medium, a computer executable instruction being stored in the computer storage medium, and the computer executable instruction being used to perform the foregoing image information processing method.

According to the image information processing method and apparatus, and the computer storage medium in the embodiments of the present technology, a first part of a first image is intelligently recognized to obtain feature information of the first part, a first tile matching the first part is obtained by matching the feature information of the first part with tile description information, and finally a second image is formed by replacing the first part in the first image with the first tile. This diversifies image forming and representation, makes images more interesting, simplifies operations of a user during tiling, and makes a device more intelligent and satisfactory.

DESCRIPTION OF EMBODIMENTS

The following further describes the technical solutions of the present disclosure with reference to the accompanying drawings and specific embodiments. It should be understood that, preferred embodiments described below are merely for illustration and explanation of the present disclosure, but not for limiting the present disclosure.

Figure 1:
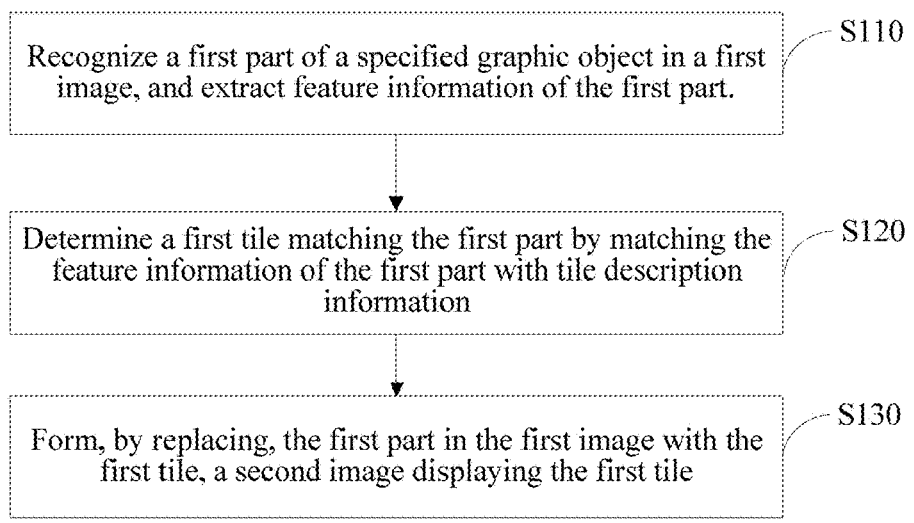
FIG. 1 is a schematic flowchart of an image information processing method according to some embodiments.

As shown in FIG. 1, this embodiment provides an image information processing method, including:

Operation S110: Recognize a first part (e.g., face, body, arm, hand, etc.) of a specified graphic object (e.g., a person) in a first image (e.g., a group photo, a portrait, etc.), and extract feature information (e.g., descriptive terms describing characteristics of the face, body, hand, person, etc.) of the first part.

Operation S120: Determine a first tile (e.g., a head sticker/mask, a face mask of an animal, celebrity, fictional character, cartoon character, etc.) matching the first part by matching the feature information of the first part with tile description information (e.g., descriptive terms stored as keys to the first tile in a database of tiles).

Operation S130: Form, by replacing the first part in the first image with the first tile, a second image displaying the first tile. For example, the tile is overlaid on the portion of the first image that corresponds to the first part.

The image information processing method in this embodiment may be applied to a terminal device such as a mobile phone, a tablet computer, or a wearable device.

Recognition is performed in the first image in operation S110. For example, a human face in the first image is recognized by using a facial recognition technology. The specified graphic object in the first image in this embodiment may include a human graphic object, an animal graphic object, and a scenery graphic object. The human graphic object includes graphics that are formed by collecting human images, the animal graphic object includes graphics that are formed by collecting animal images, and the scenery graphic object includes graphic objects that are formed by collecting images for various substances or sceneries. The specified graphic object in this embodiment may be a graphic object that is set by default by an electronic device, or may be a graphic object that is determined based on an instruction of a user. The specified graphic object herein may be one or more of the graphic objects. For example, bodies of both a human graphic object and an animal graphic object are replaced with tiles. In this case, the specified graphic object includes the human graphic object and the animal graphic object.

The first part is a portion of the specified graphic object, for example, a body part such as a human face, a body, or hairs of a human graphic object. For example, the first image may be an image including one or more human faces. The first image is usually an original image including one or more human faces. The first part exacted in operation S110 may be a whole or partial human face in the first image. Assuming that the first image includes three human faces, if the user performs tile matching for one of the human faces, in this case, the user may enter a corresponding selection instruction to the electronic device, and the device may select, according to the detected selection instruction, one or more of the human faces as the first part that needs to be replaced by means of the tile matching. It should be noted that, "first" in the first part in this embodiment is merely for general reference, and not exclusively intended to indicate a human face.

The first tile may be any form of tile, for example, a human tile, an animal tile, or a scenery tile. In this embodiment, the first tile means a tile that are in many tiles and that matches the feature information of the first part. For example, it is found by extracting information about the first part that the first part shows a charmingly naive human character. In this case, description information of a panda face tile in the tiles also includes "charming naive". Apparently, the panda face tile may be the first tile matching the charmingly naive human character (that is, the first part).

In operation S130, the second image displaying the first tile is formed by replacing the first part with the first tile. If the panda face is used to replace a human face of a human image A, the second image that is formed by means of replacement does not include the human face of the human image A, and the human face of the human image A is replaced with the panda face tile. Operation S130 may include: automatically adjusting, by the electronic device, a size of the first tile to fit the first part, superposing the first tile on the first part, directly removing the first part in the first image, and placing the first tile on the removed part of the image.

It should be noted that, the first tile includes a static tile and a dynamic tile. The static tile usually includes only one picture. The dynamic tile usually includes at least two tiles. When the formed second image is displayed, the dynamic tile presents a change in pattern or content, forming a dynamic effect. For example, it is assumed that the first tile is a dynamic tile, and the dynamic tile includes three cat expression tiles. After the second image is formed, when the second image is displayed, the three cat expression tiles are displayed in turn, forming a dynamic display effect.

A specific implementation of operation S130 may include:

positioning a first position of the first part in the first image by using the facial recognition technology; and forming the second image by laying the first tile at the first position. In a specific implementation process, the method may further include: adjusting a display area of the first tile to fit a display area of the first part and/or adjusting a display tone of the first tile to be consistent with a display tone of the first part, and then laying the first tile at the first position. In this way, a display effect of the second image can be improved.

In a specific implementation process, the device is provided with a physical control or a virtual control for triggering the device to perform operation S110 to operation S130. Tile matching and replacement operations are detected by using the physical control or the virtual control. After the tile matching and replacement operations are detected, the device automatically performs operation S110 to operation S130 in sequence.

In a specific implementation process, the method may further include: an operation of storing the second image and/or the first image. A sharing entrance is provided on an operating interface where the second image is formed. When a sharing operation is detected, the second image may be shared to a specified web page or application. During sharing, to make it more interesting, after the operation of sharing the second image is detected, the electronic device further automatically shares the first image after the second image is shared, and shares the first image to the specified web page or application where the second image is shared, so that the user does not need to unravel the trick of the second image by performing the sharing operation twice. Certainly, when detecting that the first or the second image is shared, the electronic device may alternatively share both the first image and the second image to the specified web page or application after horizontally or vertically arranging them, so that a user receiving the shared images conveniently views the first image and the second image by comparison. In this way, when the user performs the sharing operation, the user does not need to additionally select the first image or find the first image to share the image separately. For example, the specified web page is microblog, and the application receiving the sharing may include an application such as social networking applications WeChat or QQ.

Apparently, this embodiment provides an image processing method, in which software and hardware resources of an existing device are better used to match and replace a human face with various tiles, which diversifies image representation, makes images more interesting, simplifies operations of a user during tiling, and makes the device more intelligent and satisfactory.

Figure 2A:
FIG. 2A is a schematic diagram of an effect of a first image according to some embodiments.
Figure 2B:
FIG. 2B to FIG. 2D are schematic diagrams of effects of a second image that is formed after an image is processed based on an image information processing method in accordance with some embodiments.
Figure 2C:
Figure 2D:

Based on the image processing method in this embodiment, FIG. 2A shows an original image used as the first image, and FIG. 2B shows a second image including animal tiles that is formed by replacing human faces shown in FIG. 2A with the animal tiles. FIG. 2C shows a second image including cartoon tiles that is formed by replacing the human faces shown in FIG. 2A with the cartoon tiles. FIG. 2D shows a second image including mask tiles that is formed by replacing the human faces shown in FIG. 2A with the mask tiles. It may be known from FIG. 2A to FIG. 2D that, the second image that is formed by replacing the first part with the tile may be very different from the first image. Information expressed by the second image is very different from that expressed by the first image, the formed second image is very interesting, and image forming and interesting expression are diversified.

Figure 3A:
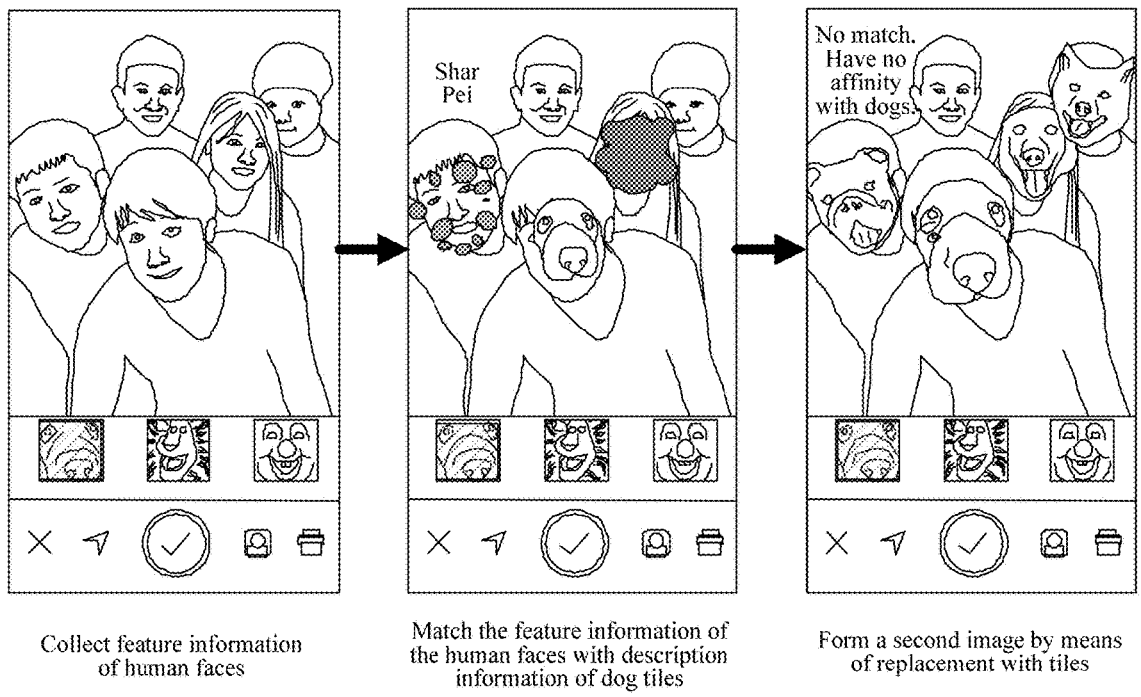
FIG. 3A is a schematic diagram of a first processing effect based on an image information processing method in accordance with some embodiments.

FIG. 3A shows a process in which human faces are used as first parts and that is performed based on the image processing method in this embodiment. First, feature information of the human faces is collected from an original image. Next, the feature information of the human faces is matched with description information of dog tiles. Finally, a second image is formed by replacing the first parts with the tiles.

Figure 3B:
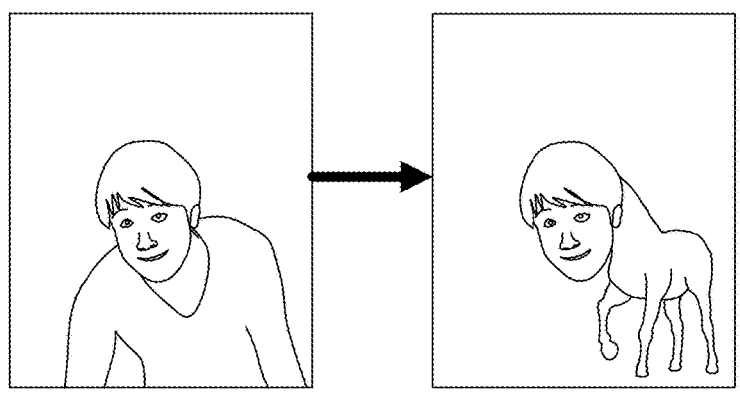
FIG. 3B is a schematic diagram of a processing effect based on an image information processing method in accordance with some embodiments.

FIG. 3B is a schematic diagram of an effect of replacing a human body that is used as a first part with a tile based on the image processing method in this embodiment. The left diagram in FIG. 3B is a first image before the replacement, and the right diagram in FIG. 3B is a second image that is formed after the replacement. In the second image shown in FIG. 3B, the human body in the first image is replaced with a horse body, which is obviously very interesting.

As shown in FIG. 1, this embodiment provides an image information processing method, including:

Operation S110: Recognize a first part of a specified graphic object in a first image, and extract feature information of the first part.

Operation S120: Determine a first tile matching the first part by matching the feature information of the first part with tile description information.

Operation S130: Form, by replacing the first part in the first image with the first tile, a second image displaying the first tile.

Operation S110 may include:

recognizing the first part, and extracting at least one of a gender feature, an age feature, a facial contour feature, a body feature, and an expression feature of the first part.

In this embodiment, the feature information of the first part includes the gender feature, for example, male or female. The age feature may include a child, a junior, a senior, or the like. The facial contour feature may include a long face, a square face, a round face, a pointed face, or the like. The facial contour feature may further include features such as contours of five sense organs and positions of the five sense organs that can identify a human face. The body feature may include a size of a human face, a size of a body, and the like, which may be determined by comparing multiple human images. For the expression feature, it may be seen that the first part is smiling, crying, or expressionless by means of facial recognition.

Certainly, during specific implementation, the feature information of the first part may further include a feature of an ornament worn on a head, for example, whether glasses are worn and the worn glasses are transparent glasses or sunglasses. The present disclosure is not limited to the feature information of the first part in this embodiment.

In operation S130, the feature information of the first part is matched with the tile description information, to determine the first tile. For a specific example, a star tile that matches the first part is found by matching the facial contour information with description information of star tiles. For another example, an animal tile matching the expression feature is found by matching the expression feature with description information of animal tiles. For example, there is an angry face in the first image, and a tile such as an angry bird may be used to replace the angry face, to form a very interesting second image.

As shown in FIG. 1, this embodiment provides an image information processing method, including:

Operation S110: Recognize a first part of a specified graphic object in a first image, and extract feature information of the first part.

Operation S120: Determine a first tile matching the first part by matching the feature information of the first part with tile description information.

Operation S130: Form, by replacing the first part in the first image with the first tile, a second image displaying the first tile.

Operation S120 may include:

matching the feature information of the first part with description information of at least one of a star tile, an animal tile, a cartoon tile, a movie tile, and a mask tile.

The star tile in this embodiment is defined as a human image of a celebrity in various tiles, for example, a tile of an entertainment star, a tile of a sports star, or a tile of a politician star. The star tile usually includes an obvious human face. The animal tile may include tiles of various animals, for example, tiles of various pets such as cats and dogs and tiles of various wild animals. The animal tile usually includes head images of various pets. The cartoon tile may include tiles of various cartoon and anime characters, and usually includes tiles of faces or heads of the cartoon or anime characters. The mask tile may include various types of clown masks, Peking Opera masks, and the like. The movie tile may be tiles of various elements from movies, for example, tiles of human characters in movies, tiles of animal characters in movies, and tiles of modeling in movies.

During specific implementation, the tiles may further include a scenery tile, for example, tiles of various flowers and tiles of various buildings.

In operation S120, a gender of a star included in a start tile may be determined according to the gender feature in one embodiment, an age of a human or an animal in a tile may be selected according to the age feature, a tile of a star face that is the same as or similar to the facial contour feature may be found by using the facial contour feature, and the like. For another example, a corresponding animal tile is selected by using the body feature. For another example, a human expression in a tile is determined according to the expression feature.

The tiles may be further classified according to different parts, and may be classified into various tiles such as a face tile, a limb tile, and a body tile. In this case, operation S120 further includes: determining a tile type corresponding to the first part; and matching description information of the corresponding type of tile with the feature information of the first part according to the determined tile type, to determine the first tile.

In conclusion, according to the image information processing method in this embodiment, the first tile matching the first part may be determined by matching the feature information of the first part with description information of one or more tiles. In a specific implementation process, the method further includes: detecting an instruction of a user; and determining, according to the instruction of the user, a type of tiles matching the first part. For example, a user A has an image including a face of a user B, and wants to replace the face of the user B with a pet avatar. In this case, the user A may enter a user instruction to an electronic device to select pet avatars as tiles, so that after receiving the user instruction, the electronic device matches tile description information of the selected pet avatars with the feature information of the first part during performing the image information processing method, to select, from the tiles of pet avatars, a first tile that mostly matches the first part. In operation S130, the selected first tile is used to replace the face of the user B. In this way, a second image including a body of the user B and the pet avatar is formed, thereby simply forming an interesting avatar.

On a display interface where the image information processing in this embodiment is performed, a checkbox or a dialog box for selecting a type of the tiles may be displayed, to select a corresponding checkbox or to participate in a corresponding dialog, to simply select the type of the tiles. For example, as shown in FIG. 3A, there are icons below the image to select various tiles. In FIG. 3A, an icon represented as a semi-transparent shadow is a tile of a dog, and the semi-transparent shadow represents that the tile of the dog is selected to replace a human face in the image. Various operating controls used to form a second image are below the tiles shown in FIG. 3A, and are not described herein one by one.

In conclusion, in this embodiment, if the user does not specify a type of tiles or the electronic device does not set a type of tiles by default, in operation S120, the feature information of the first part may be matched with description information of various tiles, to determine a first tile that mostly matches the feature information of the first part, and replace the first part in the subsequent operation, to form an interesting second image.

As shown in FIG. 1, this embodiment provides an image information processing method, including:

Operation S110: Recognize a first part of a specified graphic object in a first image, and extract feature information of the first part.

Operation S120: Determine a first tile matching the first part by matching the feature information of the first part with tile description information.

Operation S130: Form, by replacing the first part in the first image with the first tile, a second image displaying the first tile.

The method further includes:

forming label information on the second image, for a specific example, displaying the label information at a periphery corresponding to the first part in the second image. Certainly, the label information formed in the second image may alternatively be located at any position in the second image, and is not limited to the periphery of the first part.

In this embodiment, the method further includes displaying the label information. The label information may be a feature description of the tile. For example, the label information may include a name of the first tile and main characteristics of the first tile. For a specific example, the label information includes at least one of a tile name of the first tile, description information of the first tile, and a mapped interesting dialog of the first tile. For example, the first tile is a panda, the label information may include the following words or pictures: "panda, charmingly naive". Therefore, an amount of information of the second image is apparently increased, and the second image is more interesting and transfers more information.

Certainly, the label information may alternatively include label information of the feature information of the first part, and include evaluation information that is formed according to the feature information of the first part, for example, various information such as "beauty as a flower".

The label information may alternatively include label information of a tile matching result. For example, no first tile matching feature information of a human face is found, and in this case, the matching result may be conveyed to a user by using the label information. For example, an image including multiple human faces is matched with tile description information of various dogs, and it is found that a human face does not match the tiles of the dogs. In this case, interesting sentences such as the following words of "No match. Face features are peculiar, and have no affinity with dogs" may be given by using the label information, to make the second image more interesting and satisfactory.

The label information, for example, "Shar Pei" and "No match. Have no affinity with dogs", is displayed in FIG. 3A. The label information in FIG. 3A is displayed near a replaced human face (the first part). That is, in this case, the label information is displayed at a periphery corresponding to the first part in the second image.

Figure 4:
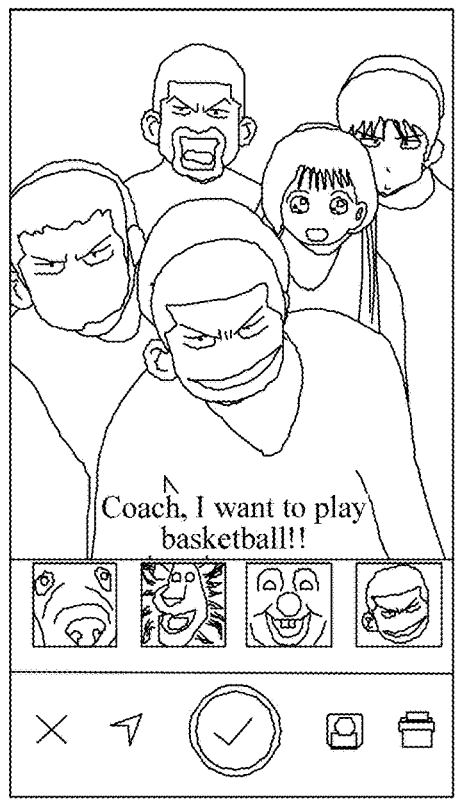
FIG. 4 and FIG. 5 are schematic diagrams of effects of a second image that is formed after an image is processed based on an image information processing method in accordance with some embodiments.
Figure 5:
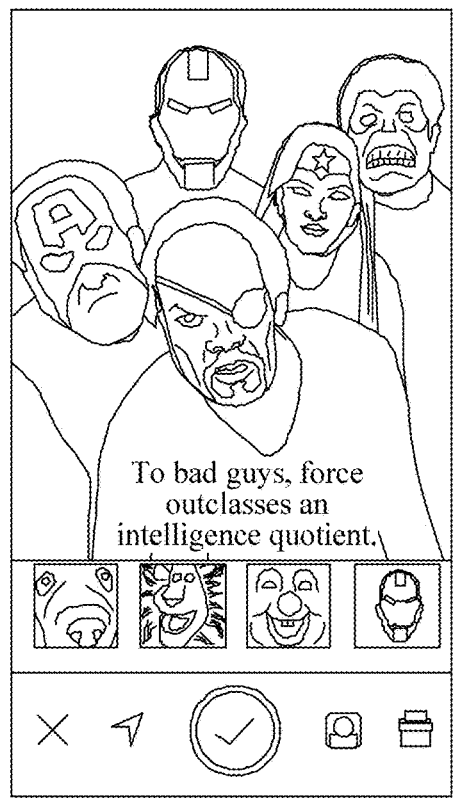

The label information "Coach, I want to play basketball!!" is displayed in FIG. 4, and "To bad guys, force outclasses an intelligence quotient" is displayed in FIG. 5. Apparently, the label information in FIG. 4 and FIG. 5 is displayed on a lower part of the second image rather than displayed at a periphery of a replaced human face (that is, the first part).

Based on the above, an image information processing method includes: at a device having one or more processors and memory: locating respective image regions corresponding to one or more persons captured in a first image (e.g., a photo of one or more people); extracting feature information (e.g., descriptive terms describing one or more characteristics) of a respective facial portion (or body portion, or accessary portions, or limb portion, etc.) of at least a first person of the one or more persons located in the first image; identifying, from a plurality of image tiles (e.g., animal tiles, cartoon tiles, celebrity tiles, etc.), a first image tile (e.g., a panda head) that matches the respective facial portion of the first person in accordance with predefined correspondence between the feature information of the respective facial portion of the first person and pre-stored description information of the first image tile; and forming, by replacing the respective facial portion of the first person in the first image with the first image tile, a second image that includes at least a modified version of the respective image region corresponding to the first person of the one or more persons.

In some embodiments, locating respective image regions corresponding to one or more persons captured in the first image includes: performing face recognition on the first image; and identifying one or more faces in the first image in accordance with result of the face recognition. In some embodiments, similar methods can be used to perform body parts, accessary recognition, in addition to the facial recognition.

In some embodiments, extracting feature information of a respective facial portion of at least a first person of the one or more persons located in the first image includes: determining one or more descriptive labels corresponding to the respective facial portion of the first person using a first machine learning model, wherein the first machine learning model is trained with the facial images and corresponding descriptive labels.

In some embodiments, extracting feature information of a respective facial portion of at least a first person of the one or more persons located in the first image includes: determining an identity of the first person (e.g., a user ID on the social network platform) based on the respective facial portion of the first person (e.g., based on facial recognition methods); locating respective profile information of the first person based on the determined identity of the first person; and using one or more characteristics in the respective profile information (e.g., age, gender, location, interest, height, size, etc. in the social network profile of the user identified in the image) of the first person as the one or more descriptive labels corresponding to the respective facial portion of the first person.

In some embodiments, extracting feature information of a respective facial portion of at least a first person of the one or more persons located in the first image includes: receiving user comments (e.g., a comment received in a group chat session regarding a person in a group picture or a portrait of the person when the picture is shared in the group chat) regarding the first person identified in the first image; and using one or more descriptive terms (e.g., cute, cool, kongfu master, etc.) from the user comment as the one or more descriptive labels corresponding to the respective facial portion of the first person.

In some embodiments, the method includes: receiving a first user comment including a first descriptive term for the first person identified in the first image; in response to receiving the first user comment, displaying the first image that is modified with the respective facial portion of the first person replaced with a first image tile that matches the first descriptive term; while displaying the first image that is modified with the respective facial portion of the first person replaced with the first image tile, receive a second user comment including a second descriptive term that is different from the first descriptive term for the first person identified in the first image; and in response to receiving the second user comment, displaying the first image that is modified with the respective facial portion of the first person replaced with a second image tile that is different from the first image tile, and that matches the second descriptive term. In some embodiments, the first user comment and the second user comment are received from different users in a group chat session, and the first image is an image that is shared in the group chat session, and wherein the first image is displayed and updated on client device corresponding to the users from which the first user comment and the second user comment are received. In some embodiments, the update is in real-time when a new comment is received from one of the participant of the group chat, and the image is updated on devices of all participants of the group chat.

In some embodiments, when a facial portion of the first person is identified, and one or more sub-portions of the facial portion are also identified. In some embodiments, the sub-portions that correspond to one or more key features of the first person are extracted from the first image, and overlaid on the image tile after the image tile is used to replace the facial portion of the first person in the first image. For example, when a person's face is identified and replaced with a panda head, the person's mole is placed back onto the image, over the panda's face. In another example, glasses are identified on the person's face, and the image sub-region corresponding to the glasses are extracted from the first image. After the image portion that corresponds to the first person's face is replaced by an image tile, such as the face of a dog, the glasses are placed over the dog's face. In some embodiments, the sub-portions are adjusted to fit the image tile. For example, the size of the glasses may be adjusted to fit the width of the dog face. In some embodiments, a feature of the face is identified, and a cartoon version or stylized version of the feature is overlaid on the image tile that replaced the facial portion of the first person.

In some embodiments, when multiple persons are located in the first image, the same process is repeated for each person located in the image. In some embodiments, the image tiles that are used to replace the facial portions of the people are pre-grouped image tiles, e.g., members of a band, key characters of a movie, etc. In some embodiments, an anchor person is selected in the image, and the anchor person is matched first (e.g., to have the first pick from the fixed group of image tiles), while the other people in the image are matched after the first anchor person has been matched to one of the image tiles of the group. In some embodiments, the tiles are rotated among the people in the image, and the user can select the best match after seeing multiple versions corresponding to different matches between the people in the image and the image tiles in the group.

Many details are disclosed with respect to various embodiments of the present technology. The features disclosed with respect to different embodiments may be combined without limitation, and in the interest of brevity, the combinations are not exhaustively enumerated herein.

Figure 6:
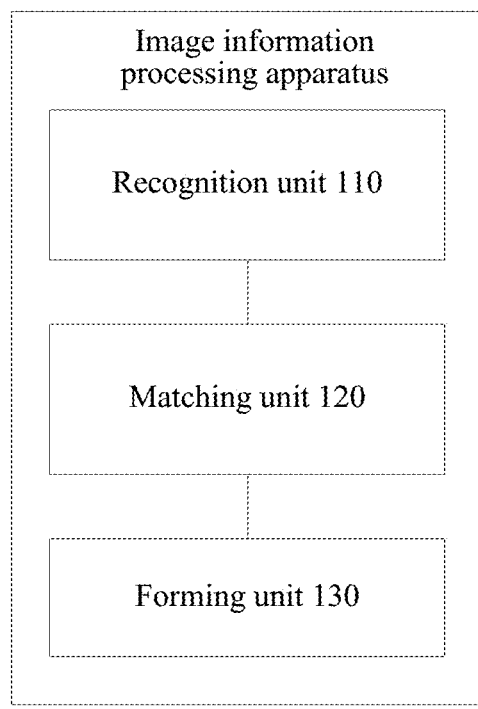
FIG. 6 is a schematic structural diagram of an image information processing apparatus according to some embodiments.
Figure 7:
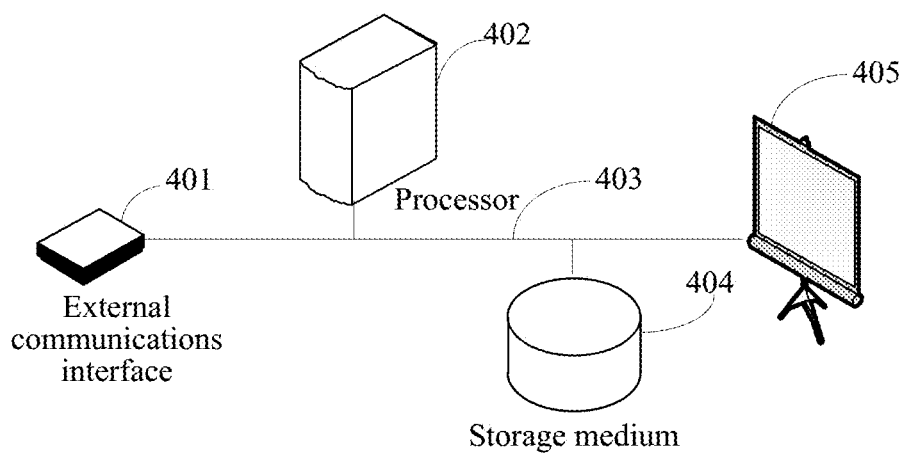
FIG. 7 is a schematic structural diagram of an image information processing apparatus according to some embodiments.

As shown in FIG. 6, this embodiment provides an image information processing apparatus, including:

a recognition unit 110, configured to: recognize a first part of a specified graphic object in a first image, and extract feature information of the first part;

a matching unit 120, configured to determine a first tile matching the first part by matching the feature information of the first part with tile description information; and a forming unit 130, configured to form, by replacing the first part in the first image with the first tile, a second image displaying the first tile.

The image information processing apparatus in this embodiment may be applied to any type of electronic device, for example, a mobile phone, a tablet computer, a wearable device, a notebook computer, or a desktop computer.

The recognition unit 110, the matching unit 120, and the forming unit 130 may all correspond to a processor or a processing circuit. The processor may include a processing structure such as a central processing unit, a microprocessor, a digital signal processor, or a programmable array. The processing circuit may include an application-specific integrated circuit.

The recognition unit 110, the matching unit 120, and the forming unit 130 may integrally correspond to a same processor or processing circuit, or may separately correspond to different processors or processing circuits. When the recognition unit 110, the matching unit 120, and the forming unit 130 integrally correspond to the same processor or processing circuit, the processor or processing circuit may implement functions of the recognition unit 110, the matching unit 120, and the forming unit 130 by using time division multiplexing or concurrent threads. Certainly, the apparatus may further correspond to a storage medium. The storage medium can be connected to the processor or processing circuit by using a structure such as a bus. An instruction that can be executed by the processor or processing circuit may be stored in the storage medium. The processor or processing circuit may implement the functions of the functional units by reading and executing the instruction.

The image information processing apparatus in this embodiment may be a hardware structure of the image information processing method described in some embodiments. The apparatus can automatically perform information matching, and automatically replaces a first part of a specified graphic object in a first image with a tile, to form an interesting second image different from the first image. Image forming is diversified, and the apparatus is more intelligent and satisfactory.

The recognition unit 110 is configured to: recognize the first part, and extract at least one of a gender feature, an age feature, a facial contour, a body feature, and an expression feature of the first part.

In conclusion, a feature recognized by the recognition unit 110 in this embodiment may be at least one feature of the first part. For example, the first part is a face, and features of the first part may include information such as the facial contour feature and the expression feature. Certainly, the first part may be a body of a human graphic object, and the recognition unit 110 may recognize the body feature and the like. A structure is simple and implementation is easily.

This embodiment further defines the apparatus described in some embodiments. In these embodiments, the matching unit 120 is specifically configured to match the feature information of the first part with description information of at least one of a star tile, an animal tile, a cartoon tile, a movie tile, and a mask tile. The feature information of the first part may be matched with at least one of description information of various tiles, to obtain the first tile meeting a match condition. There are a large variety of tiles in this embodiment, so as to meet a user requirement for replacement with various tiles, and form a desirable second image, thereby making an electronic device more intelligent and satisfactory.

The forming unit 130 is further configured to form label information on the second image, for a specific example, display the label information at a periphery corresponding to the first part in the second image.

Certainly, the apparatus further includes:

a display unit, configured to display the label information at the periphery corresponding to the first part in the second image.

In this embodiment, the apparatus further includes the display unit. The display unit may correspond to any type of display screen such as a liquid crystal display screen, an electronic ink display screen, a projection display screen, or an organic light-emitting diode display screen. The display screens can display the second image, and display the label information at the periphery corresponding to the first part in the second image. The label information may increase an amount of information of the second image, and enrich the second image. In a specific implementation process, the apparatus may further include a storage unit. The second image and the label information may be stored in the storage unit. The apparatus may further include a communications unit. The communications unit is connected to a social application to share the formed second image. The storage unit may correspond to various types of storage media. The communications unit may correspond to various types of communications interfaces, for example, electric cable interfaces and optical cable interfaces in wired interfaces, and various types of antennas in wireless interfaces.

In a further improvement of this embodiment, the label information may include at least one of label information of the first tile, label information of the feature information of the first part, and label information of a tile matching result. In this embodiment, the label information may be the label information of the first tile, the label information of the feature information of the first part, or the label information of the tile matching result. The label information herein may be a title, a feature description, various types of interesting dialogs, or the like.

The following provides two specific examples with reference to the foregoing embodiment.

Example 1

This example provides an image information processing method, including:

selecting pet tiles;

automatically detecting human faces in an original image;

extracting feature information such as genders, ages, and sizes of the human faces in the original image;

automatically matching the extracted feature information with description information of the pet tiles; and finally, automatically superposing a pet tile that is obtained by means of matching on a corresponding human face, and laying label information near the face. In addition, various content is displayed with cool dynamic effects to make experience more interesting.

For example, feature information of a human face that is detected and analyzed by an electronic device by using a facial recognition technology includes: a gender of male, an age of 30, and a relatively fat face. A tile that finally successfully matches the feature information is a panda.

Next, during information analysis, the human face is fed back in a form of animation to a user for facial recognition. Finally, the matching panda face is superposed on the face of the corresponding human image, to replace the human face.

Example 2

An embodiment of the present technology further provides a schematic structural diagram of an image processing apparatus configured to implement the image information processing method in the embodiments of the present technology. The apparatus includes a processor 402, a storage medium 404, and at least one external communications interface 401. The processor 402, the storage medium 404, and the external communications interface 401 are connected to each other by using a bus 403. The processor 402 may be an electronic component having a processing function, for example, a microprocessor, a central processing unit, a digital signal processor, or a programmable logic array.

A computer executable instruction is stored in the storage medium 404. The processor 402 executes the computer executable instruction stored in the storage medium 404, to implement any one of the image information processing methods disclosed in multiple embodiments.

In the several embodiments provided in the present application, it should be understood that the disclosed apparatus and method may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the apparatuses or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present technology may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the art may understand that, some or all of operations for implementing the method embodiments may be implemented by using hardware related to a program instruction. The program may be stored in a computer readable storage medium. When the program is executed, the operations including the method embodiments are performed. However, the storage medium includes various types of media that may store program code, for example, a mobile storage device, a read-only memory (ROM), a random access memory (RAM), a magnetic disk, or an optical disk.

The embodiments of the present technology further provide a computer storage medium. A computer executable instruction is stored in the computer storage medium, and the computer executable instruction is used to perform at least one of the image information processing methods provided in the foregoing embodiments, for example, the method shown in FIG. 1. The computer storage medium in the embodiments of the present technology may be any type of storage medium, or is optionally a non-transitory storage medium.

The above are only specific implementations of the present disclosure, but the protection scope of the present disclosure is not limited thereto. Modifications that are made according to the principle of the present disclosure shall fall within the protection scope of the present disclosure.

What is claimed is:

1. An image information processing method, comprising:
at a device having one or more processors and memory:
performing face recognition on a first image;
identifying one or more faces corresponding to one or more persons in a first image in accordance with result of the face recognition;
extracting feature information of a respective facial portion of at least a first person of the one or more persons located in the first image;
receiving a first user comment including a first descriptive term for the first person identified in the first image;
in response to receiving the first user comment, displaying the first image that is modified with the respective facial portion of the first person replaced with a first image tile that matches the first descriptive term and the respective facial portion of the first person in accordance with predefined correspondence between the feature information of the respective facial portion of the first person and pre-stored description information of the first image tile;
while displaying the first image that is modified with the respective facial portion of the first person replaced with the first image tile, receiving a second user comment including a second descriptive term that is different from the first descriptive term for the first person identified in the first image; and
in response to receiving the second user comment, displaying the first image that is modified with the respective facial portion of the first person replaced with a second image tile that is different from the first image tile, and that matches the second descriptive term.

2. The method of claim 1, wherein extracting feature information of a respective facial portion of at least a first person of the one or more persons located in the first image includes:
determining one or more descriptive labels corresponding to the respective facial portion of the first person using a first machine learning model, wherein the first machine learning model is trained with the facial images and corresponding descriptive labels.

3. The method of claim 1, wherein extracting feature information of a respective facial portion of at least a first person of the one or more persons located in the first image includes:
determining an identity of the first person based on the respective facial portion of the first person;
locating respective profile information of the first person based on the determined identity of the first person; and
using one or more characteristics in the respective profile information of the first person as the one or more descriptive labels corresponding to the respective facial portion of the first person.

4. The method of claim 1, wherein the first user comment and the second user comment are received from different users in a group chat session, and the first image is an image that is shared in the group chat session, and wherein the first image is displayed and updated on client device corresponding to the users from which the first user comment and the second user comment are received.

5. A device for image information processing, comprising:
one or more processors; and
memory storing instructions which when executed by the one or more processors, cause the processors to perform operations comprising:
performing face recognition on a first image;
identifying one or more faces corresponding to one or more persons in a first image in accordance with result of the face recognition;
extracting feature information of a respective facial portion of at least a first person of the one or more persons located in the first image;
receiving a first user comment including a first descriptive term for the first person identified in the first image;
in response to receiving the first user comment, displaying the first image that is modified with the respective facial portion of the first person replaced with a first image tile that matches the first descriptive term and the respective facial portion of the first person in accordance with predefined correspondence between the feature information of the respective facial portion of the first person and pre-stored description information of the first image tile;
while displaying the first image that is modified with the respective facial portion of the first person replaced with the first image tile, receiving a second user comment including a second descriptive term that is different from the first descriptive term for the first person identified in the first image; and in response to receiving the second user comment, displaying the first image that is modified with the respective facial portion of the first person replaced with a second image tile that is different from the first image tile, and that matches the second descriptive term.

6. The device of claim 5, wherein extracting feature information of a respective facial portion of at least a first person of the one or more persons located in the first image includes:

determining one or more descriptive labels corresponding to the respective facial portion of the first person using a first machine learning model, wherein the first machine learning model is trained with the facial images and corresponding descriptive labels.

7. The device of claim 5, wherein extracting feature information of a respective facial portion of at least a first person of the one or more persons located in the first image includes:

determining an identity of the first person based on the respective facial portion of the first person;

locating respective profile information of the first person based on the determined identity of the first person; and using one or more characteristics in the respective profile information of the first person as the one or more descriptive labels corresponding to the respective facial portion of the first person.

8. The device of claim 5, wherein the first user comment and the second user comment are received from different users in a group chat session, and the first image is an image that is shared in the group chat session, and wherein the first image is displayed and updated on client device corresponding to the users from which the first user comment and the second user comment are received.

9. A non-transitory computer-readable storage medium storing instructions which, when executed by one or more processors, cause the processors to perform operations comprising:

performing face recognition on a first image;

identifying one or more faces corresponding to one or more persons in a first image in accordance with result of the face recognition;

extracting feature information of a respective facial portion of at least a first person of the one or more persons located in the first image;

receiving a first user comment including a first descriptive term for the first person identified in the first image;

in response to receiving the first user comment, displaying the first image that is modified with the respective facial portion of the first person replaced with a first image tile that matches the first descriptive term and the respective facial portion of the first person in accordance with predefined correspondence between the feature information of the respective facial portion of the first person and pre-stored description information of the first image tile;

while displaying the first image that is modified with the respective facial portion of the first person replaced with the first image tile, receiving a second user comment including a second descriptive term that is different from the first descriptive term for the first person identified in the first image; and in response to receiving the second user comment, displaying the first image that is modified with the respective facial portion of the first person replaced with a second image tile that is different from the first image tile, and that matches the second descriptive term.

10. The non-transitory computer-readable storage medium of claim 9, wherein extracting feature information of a respective facial portion of at least a first person of the one or more persons located in the first image includes:

determining one or more descriptive labels corresponding to the respective facial portion of the first person using a first machine learning model, wherein the first machine learning model is trained with the facial images and corresponding descriptive labels.

11. The non-transitory computer-readable storage medium of claim 9, wherein extracting feature information of a respective facial portion of at least a first person of the one or more persons located in the first image includes:

determining an identity of the first person based on the respective facial portion of the first person;

locating respective profile information of the first person based on the determined identity of the first person; and using one or more characteristics in the respective profile information of the first person as the one or more descriptive labels corresponding to the respective facial portion of the first person.

* * * * *